W. B. Smith.
Boiler-Tube Cutter.
N° 72927.   Patented Dec. 31, 1867.

Witnesses.

Inventor.
W. B. Smith
Per Munn & Co
Attorneys.

United States Patent Office.

W. BELL SMITH, OF CHARLESTON, SOUTH CAROLINA.

Letters Patent No. 72,927, dated December 31, 1867.

IMPROVED BOILER-TUBE CUTTER.

*The Schedule referred to in these Letters Patent and making part of the same.*

TO ALL WHOM IT MAY CONCERN:

Be it known that I, W. BELL SMITH, of Charleston, in the county of Charleston, and State of South Carolina, have invented a new and useful Improvement in Machine for Cutting out Boiler-Tubes; and I do hereby declare that the following is a full, clear, and exact description thereof, which will enable those skilled in the art to make and use the same, reference being had to the accompanying drawings forming part of this specification, in which—

Similar letters of reference indicate corresponding parts.

This invention relates to an improvement in the construction of a machine for cutting out the tubes of steam-boilers, and consists in a hollow mandrel secured to the flue-sheet of a tubular boiler by a shifting clamp and bolt, within which mandrel is fitted a self-feeding sliding cutter-bar, the head of which carries the cutter on an incline or wedge, that moves forward to force the cutter out and give it its feed-motion, by means of a fixed nut working in a screw on the outer end of the cutter-bar, the whole being constructed and operated by gear or friction-wheels, with a hand-crank, as hereinafter more minutely described.

Figure 1:
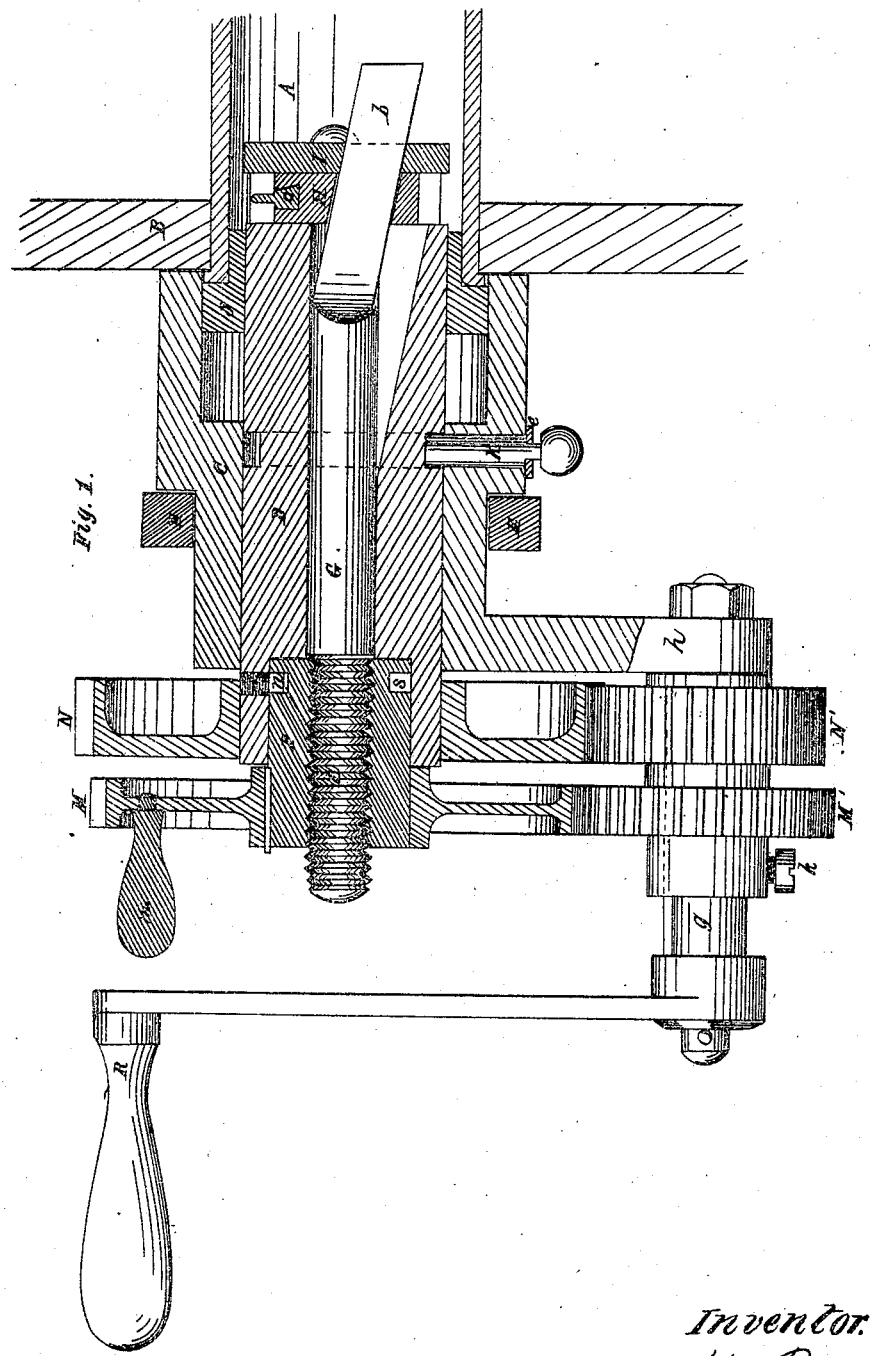
Figure 1 represents a longitudinal section through the line $x\,x$, fig. 2, of my improved tube-cutter and clamp, showing their application to a boiler-tube, internally.
Figure 2:
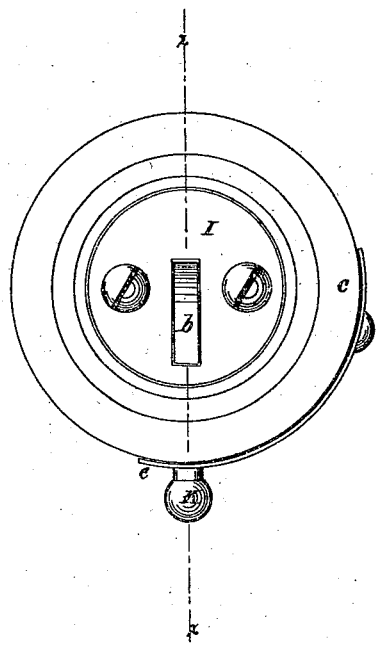
Figure 2 represents an inner end view.
Figure 3:
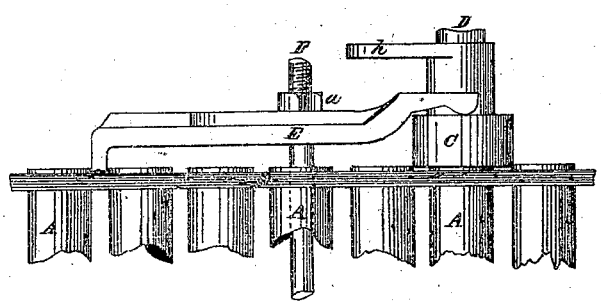
Figure 3 represents the cutter and clamp attached to a flue-sheet, showing their application externally.

A represents the tube to be cut out, B the flue-sheet in red lines. C represents the cast-iron holding-box, enclosing the hollow mandrel D, for it to work in. It is secured to the flue-sheet by a clamp, E, which is fastened by a screw-bolt, F, running through a tube, with the nut $a$, fig. 3. Within the mandrel D is fitted a cutter-bar, G, the inner end of which is bent at an angle to form an incline, $b$, made rectangular in form, to pass loosely through a slot in the cutter-block H, and also through a cap-plate, I, that is bolted to the end of the mandrel D to hold the cutter-block H in place. The cutter-block is rectangular, and fits in a cross-slot or recess in the end of the mandrel, and the cutter $c$ is dove-tailed in one end of the block, with its cutting-edge projecting therefrom as far as may be required by the thickness of the boiler-tubes to be cut. A thimble, J, fits on the end of the mandrel, and under the box C, and is inserted in the tube to be cut to keep the mandrel true in the centre. A pin, K, passes through the box C, the end of which plays in a ring-groove, $d$, around the mandrel, to keep it in place, and a spring, $e$, keeps the pin down when the cutter works, and allows it to be easily lifted out to remove the mandrel from the tube. On the outer end of the cutter-bar is a screw, L, that works in a nut, P, seated and keyed in a spur-gear, M, to feed the cutter by forcing it out with the incline $b$ when the cutter-bar moves forward. A screw-pin, $n$, fits in an annular groove, $s$, in the nut P, to keep it in place. A spur-wheel, N, is made fast on the end of the mandrel, which gears into a pinion, N', on a crank-shaft, $g$, having a bearing-support in an arm, $h$, on the box C. On the same shaft is a pinion, M', gearing into the feed-wheel M. The feed-wheel M is speeded a little faster than the spur-wheel N, and the difference of speed between the wheels causes the cutter-bar G to move forward and force the cutter $c$ out gradually, by means of the incline $b$ bearing on the cutter-block H. The feed-pinion M' is secured by a set-screw, $z$, allowing it to be readily put out of gear to run back the cutter-bar rapidly, by means of the handle $m$ on the feed-wheel M.

By the crank R, motion is given to the mandrel and cutter simultaneously, so that, by means of the self-feeding gear described, a tube can be rapidly cut out with a square end, and by turning the clamp around, and shifting the mandrel, a number of tubes can be cut without changing the position of the clamp on the flue-sheet, thus effecting great dispatch and economy of labor, and saving of material, compared with the common method of cutting out boiler-tubes.

Having described my invention, I claim as new, and desire to secure by Letters Patent—

1. The hollow mandrel D, cap-plate I, cutter-bar G, with the inclined extremity $b$, and the feed-screw L, in combination with the cutter-block H, all constructed and operating substantially as and for the purpose described.

2. The clamp E, in combination with the box C, for securing the machine to a boiler-flue sheet, in the manner described.

3. The gear-wheels M M', N N', the nut P, the mandrel D, and the cutter-bar G, combined, arranged, and operating as and for the purposes described.

4. The pin K, held by the spring $e$, and working in the annular groove $d$, in combination with the mandrel D and box C, as herein shown and described, for the purpose specified.

5. The combination of the clamp E, the box C, the mandrel D, the cutter-bar G, the cutter-block H, the nut P, and the gears M M', N N', constructed, arranged, and operating substantially as and for the purpose described.

W. BELL SMITH.

Witnesses:
J. W. HERNANDY,
JOHN B. SHINN.